United States Patent
Chen et al.

(10) Patent No.: US 9,552,243 B2
(45) Date of Patent: *Jan. 24, 2017

(54) DETECTING AN ABNORMAL SUBSEQUENCE IN A DATA SEQUENCE

(71) Applicant: International Business Machines Corporation, Armonk, NY (US)

(72) Inventors: Xiao Yan Chen, Beijing (CN); Yao Liang Chen, Beijing (CN); Sheng Huang, Shanghai (CN); Kai Liu, Beijing (CN); Chen Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 14/598,843

(22) Filed: Jan. 16, 2015

(65) Prior Publication Data

US 2015/0212868 A1 Jul. 30, 2015

(30) Foreign Application Priority Data

Jan. 27, 2014 (CN) .......................... 2014 1 0040085

(51) Int. Cl.
- *G06F 11/00* (2006.01)
- *G06F 11/07* (2006.01)
- *G05B 23/02* (2006.01)

(52) U.S. Cl.
CPC ....... *G06F 11/0751* (2013.01); *G05B 23/0232* (2013.01)

(58) Field of Classification Search
CPC ..... G06F 11/008; G06F 11/0751; G06N 7/005
See application file for complete search history.

(56) References Cited

U.S. PATENT DOCUMENTS

| 8,090,745 | B2* | 1/2012 | Hayashi | ............ G06F 17/30241 707/797 |
| 2002/0123987 | A1* | 9/2002 | Cox | .................. G06F 17/30327 |

(Continued)

OTHER PUBLICATIONS

List of IBM Patents or Patent Applications Treated as Related; CN920130148US1, Date Filed: Jan. 16, 2015, pp. 1-2.

(Continued)

*Primary Examiner* — Joseph Kudirka
(74) *Attorney, Agent, or Firm* — Cantor Colburn LLP; Keivan Razavi

(57) ABSTRACT

A method for detecting abnormal subsequences in data sequence includes constructing a hierarchical data structure of a target subsequence, each node in a bottommost layer of the data structure storing corresponding data of the target subsequence, and each node in a layer above the bottommost layer storing values based on data stored in corresponding nodes in a lower layer next to the layer above the bottommost layer; determining a second number of neighbors of the target subsequence based on the data structure of the target subsequence and of the first number of reference subsequences constructed in advance, the second number of neighbors having minimum Euclidean distances from the target subsequence; determining a third number of neighbors of each reference subsequence in the second number of reference subsequences, which have minimum Euclidean distances from each reference subsequence and determining whether the target subsequence is an abnormal subsequence.

7 Claims, 6 Drawing Sheets

(56) References Cited

U.S. PATENT DOCUMENTS

| | | |
|---|---|---|
| 2012/0041575 A1 | 2/2012 | Maeda et al. |
| 2012/0137367 A1 | 5/2012 | Dupont et al. |
| 2013/0080375 A1 | 3/2013 | Viswanathan et al. |
| 2013/0191052 A1 | 7/2013 | Fernandez et al. |

OTHER PUBLICATIONS

Xiao Yan Chen, et al.,"Detecting an Abnormal Subsequence in a Data Sequence," U.S. Appl. No. 14/741,819, filed Jun. 17, 2015.

* cited by examiner

DETECTING AN ABNORMAL SUBSEQUENCE IN A DATA SEQUENCE

FOREIGN PRIORITY

This application claims priority to Chinese Patent Application No. 201410040085.6, filed Jan. 27, 2014, and all the benefits accruing therefrom under 35 U.S.C. §119, the contents of which in its entirety are herein incorporated by reference.

BACKGROUND

The present invention relates to anomaly data detection, and more particularly, to a method and an apparatus for detecting abnormal subsequences in a data sequence.

In scenarios such as Internet of Things (IOT), smarter planet or the like, data may be generated constantly over time via a certain data generation mechanism, and thereby form a time data sequence. For example, in a scenario where atmospheric pollutants are detected by using a detector, the detector outputs data constantly over time to thereby form a time data sequence that reflects atmospheric pollution levels at respective moments. In the time data sequence, there might be some data that greatly deviate from the other data, and such data may be called abnormal data. Because the abnormal data can reflect some problem existing in the data generation mechanism or some important states of object associated with the data, it is very important to detect the abnormal data in the time data sequence.

Currently, many methods have been proposed to detect an abnormal data in a time data sequence. In these conventional methods, when it is detected whether some data in the time data sequence are abnormal, all data in the sequence have to be used, and the entire time data sequence has to be scanned for many times during the detection, which results in a huge computation amount and long time for the detection operation. In addition, distribution densities of all the data of the time data sequence (especially the time data sequence generated in a long time period) in a mapping space often differ greatly, therefore if it is detected whether some data are abnormal on the basis of the distribution densities of all the data, normal data which differ greatly from other data in the distribution density may be identified as abnormal data, rendering an inaccurate result. Moreover, the conventional methods can only conduct an off-line (non-real time) detection, rather than an online (real time) detection, on the time data sequence, which is not acceptable for some scenarios where a detection result is expected to be obtained as soon as possible.

SUMMARY

According to an aspect of the present invention, there is provided a method for detecting an abnormal subsequence in a data sequence, the data sequence including a target subsequence to be detected and a first number of reference subsequences, the method including constructing a hierarchical data structure of the target subsequence, each node in a bottommost layer of the hierarchical data structure storing corresponding data of the target subsequence, and each node in a layer above the bottommost layer storing values derived based on data stored in corresponding nodes in a lower layer next to the layer above the bottommost layer; determining a second number of neighbors of the target subsequence based on the hierarchical data structure of the target subsequence and hierarchical data structures of the first number of reference subsequences constructed in advance, the second number of neighbors of the target subsequence being the second number of reference subsequences, which have minimum Euclidean distances from the target subsequence, in the first number of reference subsequences; determining a third number of neighbors of each reference subsequence in the second number of reference subsequences, the third number of neighbors being the third number of subsequences, which have minimum Euclidean distances from the each reference subsequence, in the data sequence; and determining whether the target subsequence is an abnormal subsequence, according to the second number of neighbors of the target subsequence, and the third number of neighbors of a reference subsequence, which has the target subsequence as a neighbor thereof, in the second number of reference subsequences.

According to another aspect of the present invention, there is provided an apparatus for detecting an abnormal subsequence in a data sequence, the data sequence including a target subsequence to be detected and a first number of reference subsequences, the apparatus including a constructing device, configured to construct a hierarchical data structure of the target subsequence, each node in a bottommost layer of the hierarchical data structure storing corresponding data of the target subsequence, and each node in a layer above the bottommost layer storing a values derived based on data stored in corresponding nodes in a lower layer next to the layer above the bottommost layer; a target neighbor determining device, configured to determine a second number of neighbors of the target subsequence based on the hierarchical data structure of the target subsequence and hierarchical data structures of the first number of reference subsequences constructed in advance, the second number of neighbors of the target subsequence being the second number of reference subsequences, which have minimum Euclidean distances from the target subsequence, in the first number of reference subsequences; a reference neighbor determining device, configured to determine a third number of neighbors of each reference subsequence in the second number of reference subsequences, the third number of neighbors being the third number of subsequences, which have minimum Euclidean distances from the each reference subsequence, in the data sequence; and an anomaly detecting device, configured to determine whether the target subsequence is an abnormal subsequence, according to the second number of neighbors of the target subsequence, and the third number of neighbors of a reference subsequence, which has the target subsequence as a neighbor thereof, in the second number of reference subsequences.

With the method and the apparatus according to the above aspects of the present invention, it is detected whether the target subsequence is an abnormal subsequence based on the data of the reference subsequence influenced by the target subsequence in the data sequence, rather than all data of the data sequence, so that the computation amount and the required time for the detection may be reduced, and accuracy of the detection may be improved. In addition, for a time data sequence formed by data generated constantly over time, whenever a new subsequence is generated, the method and the apparatus described above can be used to detect whether the subsequence is an abnormal subsequence, so that an online (real time) detection can be realized.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
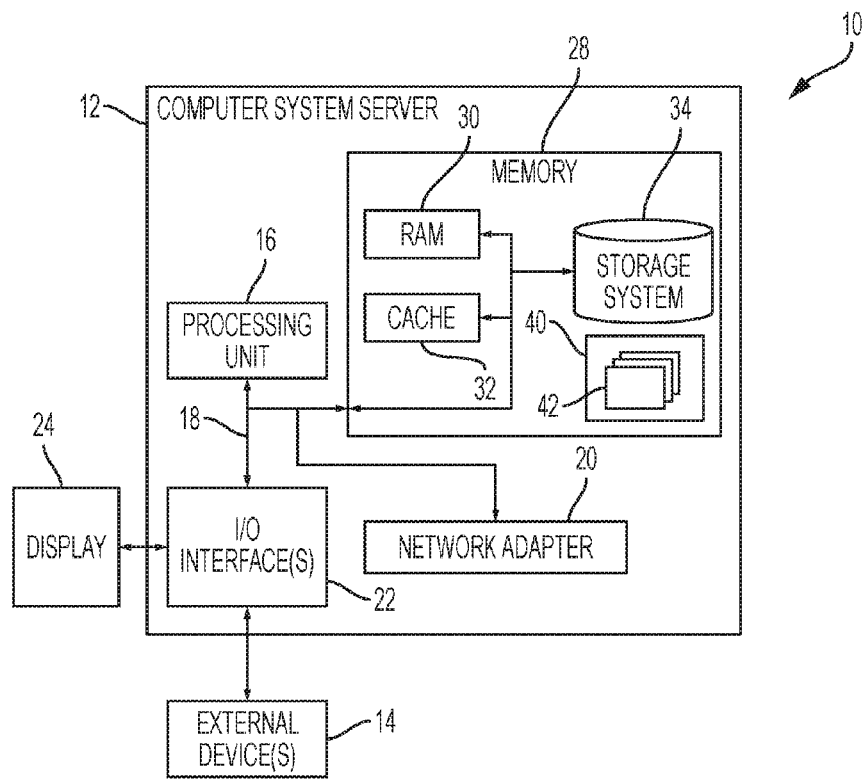
FIG. 1 shows an exemplary computer system/server which is applicable to implement the embodiments of the present invention.

Exemplary embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In view of the above, it is desirable to provide a method and an apparatus for detecting an abnormal subsequence in a data sequence, which can detect the abnormal subsequence in the data sequence accurately in real time, thereby detecting abnormal data in the data sequence accurately in real time.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

A method and an apparatus for detecting abnormal subsequences in a data sequence according to embodiments of the present invention will be described below.

The data sequence may be the time data sequence mentioned above. In this case, since data are generated constantly over time, a time window with a predetermined length can be set, and all the data generated within the time window can be extracted as the time data sequence. Alternatively, the data sequence may be a data sequence formed by data generated in other way. Hereinafter, the embodiments of the present invention are described by taking an example that the data sequence is the time data sequence, and the description is also applicable to other types of data sequences.

Figure 2:
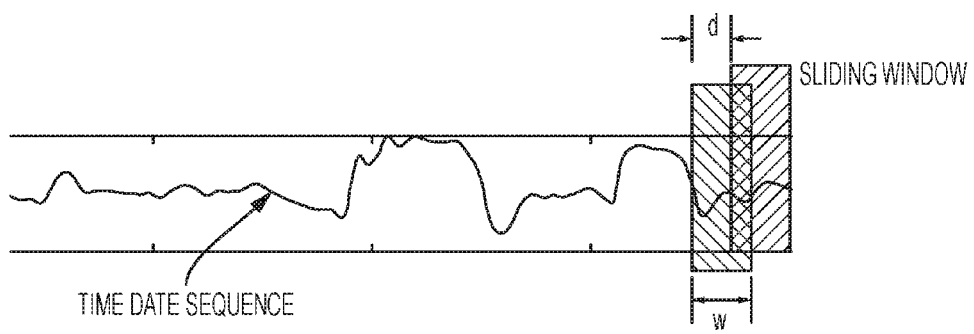
FIG. 2 is a diagram schematically showing a method for dividing a time data sequence into a plurality of subsequences according to the embodiments of the present invention.

The time data sequence may be divided into a plurality of subsequences (e.g., a plurality of subsequences with the same length), and the abnormal data in the time data sequence may be detected by detecting abnormal subsequences in the plurality of subsequences and identifying the data in the abnormal subsequences as the abnormal data. FIG. 2 schematically shows a method for dividing the time data sequence into a plurality of subsequences. In the exemplary time data sequence shown in FIG. 2, assume data on a right side are data generated earlier, and data on a left side are data generated later. A sliding window with a predetermined width w (in a unit of an amount of data) may be set, and the width w may be predetermined flexibly as required. Then, the sliding window may be used to intercept data (with the number of w) that fall into the sliding window from first data of the time data sequence, as a first subsequence. Then, the sliding window may be slid to the left by a distance d (in a unit of an amount of data) to intercept again data that fall into the sliding window, as a second subsequence. Next, the sliding window may be further slid to the left by a distance d, and a third subsequence is intercepted in the same way. In a similar fashion, the time data sequence can be divided into the plurality of subsequences by the sliding window. The distance d may be selected, so that overlapped data (i.e., data generated at a same time) between two subsequences obtained before and after the sliding take a proportion of no more than a predetermined value (e.g., 70%, 50% or other values) in the subsequence obtained before the sliding, causing the two subsequences to become "non-self" subsequences to each other. In addition, the distance d by which the sliding window is slid each time may be the same or different.

It may be detected whether each subsequence in the time data sequence is abnormal in a temporal order. For example, since the data are generated constantly over time, whenever a predetermined amount (w) of data are newly generated and thereby a new subsequence is generated, it may be detected whether the new subsequence is abnormal on the basis of the new subsequence and one or more subsequences generated prior to the new subsequence. Therefore, the abnormal data (subsequence) can be detected in real time along with the generation of the data (subsequence). Alternatively, it may be detected whether a certain subsequence in the time data sequence is abnormal in another order determined according to actual needs, other than in the temporal order. The embodiments of the present invention are described hereinafter by taking an example that the detection of the abnormal subsequence is performed in the temporal order. For convenience of description, the newly generated subsequence on which the detection of the abnormal subsequence is performed is called a target subsequence, and the one or more subsequences generated prior to the target subsequence are called reference subsequences. As described later, a number of the reference subsequences is decided by a length of a binary tree queue.

Hereinafter, the method for detecting abnormal subsequences in a data sequence according to the embodiment of the present invention is described with reference to FIG. 3.

Figure 3:
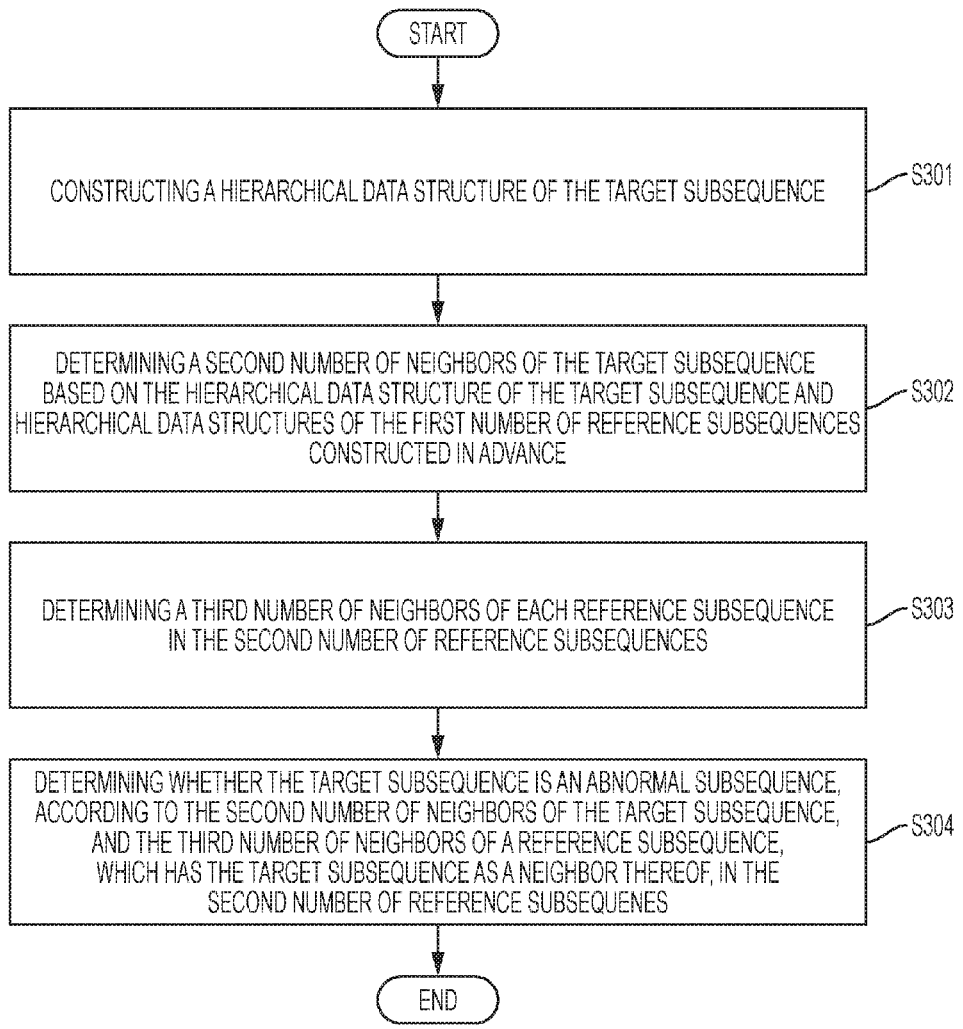
FIG. 3 is a flow chart showing a method for detecting an abnormal subsequence in a data sequence according to an embodiment of the present invention.

As shown in FIG. 3, in block S301, a hierarchical data structure of the target subsequence may be constructed, each node in a bottommost layer of the hierarchical data structure may store corresponding data of the target subsequence, and each node in a layer above the bottommost layer may store values derived based on data stored in corresponding nodes in a lower layer next to the layer above the bottommost layer. In the embodiment of the preset invention, the values derived based on the data stored in the corresponding nodes in the lower layer next to the layer above the bottommost layer, which are stored by each node in the layer above the bottommost layer, may be an average value, a maximum value and a minimum value of the data stored in the corresponding nodes.

The hierarchical data structure may be a tree, such as a binary tree, a ternary tree, a quadtree or the like, or may be a non-tree hierarchical data structure. The embodiment of the present invention is described hereinafter by taking the binary tree as an example, and the description is also applicable to other forms of the hierarchical data structure.

In the binary tree of the target subsequence, each node of the bottommost layer may store the corresponding data of the target subsequence, and each node in the layer above the bottommost layer may store the value derived based on the data stored in the corresponding nodes in the lower layer next to the layer above the bottommost layer (i.e., child nodes of the each node in the next lower layer). The derived value may be an average value, a maximum value and a minimum value. Thereby, a node (i.e., a root node) in a topmost layer (i.e., a layer where the root node is located) of the binary tree of the target subsequence may store an average value, a maximum value and a minimum value of all the data of the target subsequence. A number of the layers of the binary tree depends on a length of the target subsequence, i.e., an amount of the data included in the target subsequence. For example, when the amount Num of the data included in the target subsequence satisfies $2^{n-1}<Num\leq 2^n$ (n is a positive integer), a binary tree having (n+1) layers may be constructed. In other words, in the embodiment of the present invention, the binary tree having n+1 layers may be applicable to the target subsequence of which the data amount Num satisfies $2^{n-1}<Num\leq 2^n$. For convenience of description, hereinafter the bottommost layer of the binary tree may also be called a first layer, and the respective layers of the binary tree are numbered in an order from bottom to top. It is to be appreciated that such a numbering manner is merely illustrative, and is not to limit the protection scope of the present invention.

Figure 4:
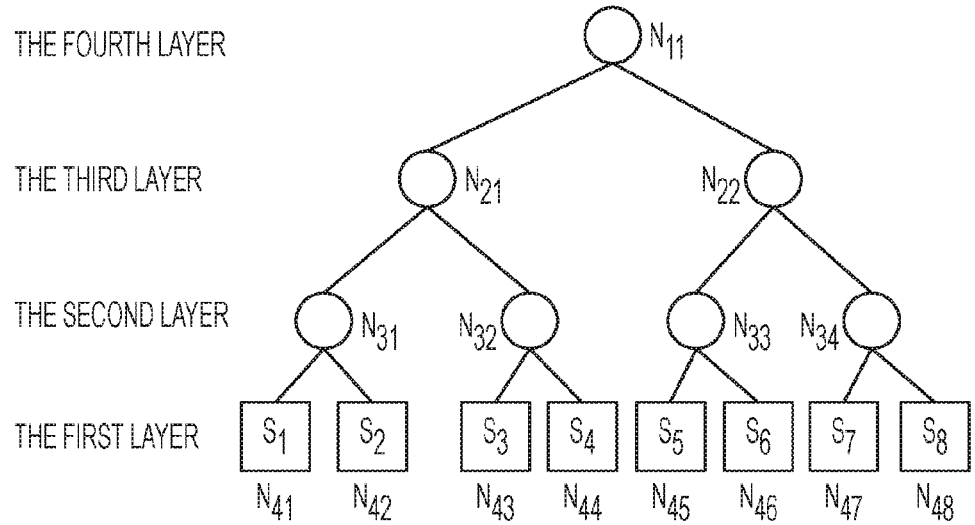
FIG. 4 shows an example of a binary tree constructed for a target subsequence according to the embodiment of the present invention.

Specifically, when the data amount Num of the target subsequence is $2^n$, the binary tree of the target subsequence may be a complete full binary tree, each of $2^n$ nodes in the bottommost layer of the binary tree may store the corresponding data of the target subsequence, each node in a layer next to the bottommost layer may store an average value between two pieces of data stored in two child nodes of the node, and a maximum value and a minimum value of the two pieces of data, and each node of a rest layer (if any) may store an average value between two average values stored in two child nodes, in a lower layer next to the rest layer, of the each node, and a maximum one of two maximum values stored in the two child nodes and a minimum one of two minimum values stored in the two child nodes. FIG. 4 shows an example of the binary tree of the target subsequence constructed in such a case. In this example, assume that the target subsequence includes 8 pieces of data $S_1$, $S_2$, $S_3$, . . . , $S_8$, i.e., n=3, thus the binary tree includes 4 layers. In a first layer of the binary tree, 8 nodes $N_{41}$-$N_{48}$ store the 8 pieces of data respectively. In a second layer of the binary tree, node $N_{31}$ stores an average value between two pieces of data stored in two child nodes $N_{41}$ and $N_{42}$ thereof, and a maximum value and a minimum value of the two pieces of data, node $N_{32}$ stores the average value between two pieces of data stored in the two child nodes $N_{43}$ and $N_{44}$ thereof, and a maximum value and a minimum value of the two pieces of data, node $N_{33}$ stores an average value between two pieces of data stored in two child nodes $N_{45}$ and $N_{46}$ thereof, and a maximum value and a minimum value of the two pieces of data, and node $N_{34}$ stores an average value between two pieces of data stored in two child nodes $N_{47}$ and $N_{48}$ thereof, and a maximum value and a minimum value of the two pieces of data. In a third layer of the binary tree, node $N_{21}$ stores an average value between the two average values stored in two child nodes $N_{31}$ and $N_{32}$ thereof, and a maximum one of the two maximum values stored in two child nodes and a minimum one of the two minimum values stored in the two child nodes, and node $N_{22}$ stores an average value between the two average values stored in two child nodes $N_{33}$ and $N_{34}$ thereof, and a maximum one of the two maximum values stored in the two child nodes and a minimum one of the two minimum values stored in the two child nodes. In a fourth layer of the binary tree, node $N_{11}$ stores an average value of the two average values stored in two child nodes $N_{21}$ and $N_{22}$ thereof, and a maximum one of the two maximum values stored in the two child nodes and a minimum one of the two minimum values stored in the two child nodes.

Figure 5:
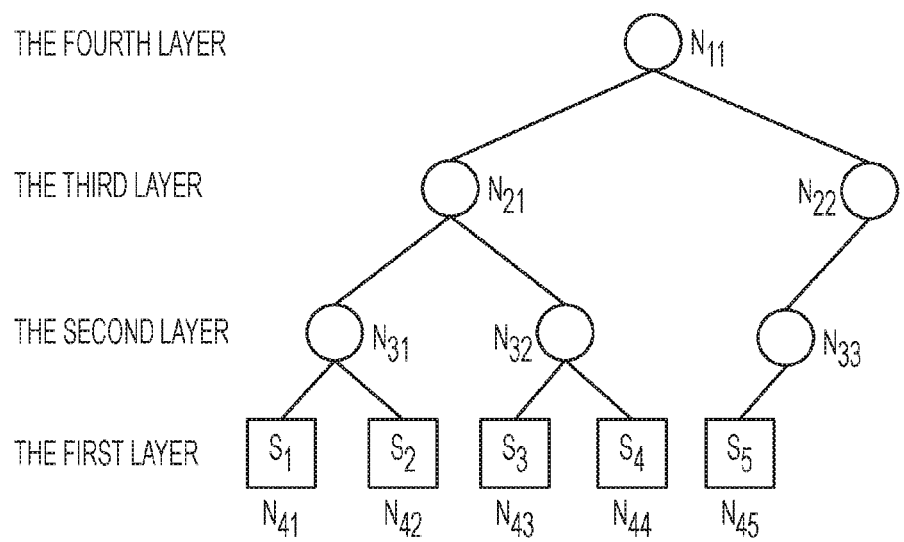
FIG. 5 shows another example of the binary tree constructed for the target subsequence according to the embodiment of the present invention.

On the other hand, when the data amount Num of the target subsequence satisfies $2^{n-1}<Num<2^n$, the binary tree of the target subsequence may be a complete non-full binary tree, a bottommost layer of the binary tree may include Num nodes, each of which may store the corresponding data of the target subsequence, each node in a layer next to the bottommost layer may store an average value as well as a maximum value and a minimum value of data stored in respective (one or two) child nodes of the node, each node of a rest layer (if any) may store an average value between average values stored in respective (one or two) child nodes, in a lower layer next to the rest layer, of the node, and a maximum one and a minimum one of maximum values and minimum values stored in the respective child nodes. FIG. 5 shows another example of the binary tree of the target subsequence constructed in such a case. In this example, assume that the target subsequence includes 5 pieces of data $S_1, S_2, \ldots, S_5$, i.e., n=3, thus the binary tree includes 4 layers. In a first layer of the binary tree, 5 nodes $N_{41}$-$N_{45}$ store the 5 pieces of data respectively. In a second layer of the binary tree, node $N_{31}$ stores an average value of two pieces of data stored in two child nodes $N_{41}$ and $N_{42}$ thereof, and a maximum value and a minimum value of the two pieces of data, node $N_{32}$ stores an average value of two pieces of data stored in two child nodes $N_{43}$ and $N_{44}$ thereof, and a maximum value and a minimum value of the two pieces of data, node $N_{33}$ stores an average value, a maximum value and a minimum value of data stored in a child node $N_{45}$ thereof (i.e., the data per se stored in the child node $N_{45}$). In a third layer of the binary tree, node $N_{21}$ stores an average value between the two average values stored in two child nodes $N_{31}$ and $N_{32}$ thereof, and a maximum one of the two maximum values stored in the two child nodes and a minimum one of the two minimum values stored in the two child nodes, and node $N_{22}$ stores an average value of the average value stored in a child node $N_{33}$ thereof (i.e., the average value per se stored in the child node $N_{33}$), and a maximum one of the maximum value stored in the child node $N_{33}$ thereof (i.e., the maximum value per se stored in the child node $N_{33}$) and a minimum one of the minimum value stored in the child node $N_{33}$ thereof (i.e., the minimum value per se stored in the child node $N_{33}$). In a fourth layer of the binary tree, node $N_{11}$ stores an average value between the two average values stored in two child nodes $N_{21}$ and $N_{22}$ thereof, and a maximum one of the two maximum values stored in the two child nodes and a minimum one of the two minimum values stored in the two child nodes.

The binary tree queue may be established in advance, and the binary tree of the target subsequence may be stored in the binary tree queue after the binary tree of the target subsequence is constructed. The length M of the binary tree queue (i.e., the number M of binary trees that can be stored in the binary tree queue) may be flexibly determined according to actual needs, and the binary tree queue may follow a first-in first-out (FIFO) rule. Since it is detected whether respective subsequences in the time data sequence are abnormal in the temporal order in the embodiment, so that binary trees of the respective subsequences are constructed in the temporal order, binary trees of one or more subsequences generated before the target subsequence have been constructed in advance before the binary tree of the target subsequence is constructed in block S301, a method for constructing the binary trees of the one or more subsequences is the same as that described above for the target subsequence, and moreover, all of the binary trees of the one or more subsequences have been stored in the binary tree queue (which corresponds to a case where a number of the one or more subsequences does not exceed the length of the binary tree queue), or a part of the binary trees of the one or more subsequences have been stored in the binary tree queue (which corresponds to a case where a number of the one or more subsequences exceeds the length of the binary tree queue). When the binary tree of the target subsequence is constructed in block S301 and then is to be stored in the binary tree queue, if the binary tree queue is not full, the binary tree of the target subsequence may be stored in the binary tree queue; on the contrary, if the binary tree queue has already been full, a binary tree stored earliest in the queue may be popped, and then the binary tree of the target subsequence may be stored in the binary tree queue. It is assumed hereinafter that the binary tree queue has already been full when the binary tree of the target subsequence is to be stored in the binary tree queue, therefore, after the binary tree of the target subsequence has been stored in the binary tree queue, the binary tree queue will store the binary tree of the target subsequence and the binary trees of M-1 (i.e., a first number) subsequences generated before the target subsequence.

Returning to FIG. 3, in block S302, K (i.e., a second number, where K≥1) neighbors of the target subsequence may be determined based on the binary tree of the target subsequence and the binary trees of the M-1 reference subsequences constructed in advance, the K neighbors of target subsequences being K reference subsequences, which have minimum Euclidean distances from the target subsequence, in the M-1 reference subsequences.

In the embodiment of the present invention, when the K neighbors of the target subsequence are determined based on the binary trees, the computation amount is reduced by a dual bounding pruning technology. Briefly, upper limit values and lower limit values of the Euclidean distances between the target subsequence and the respective reference subsequences are determined hierarchically based on the binary trees, and one or more nearest neighbors of the target subsequence are determined according to the upper limit values and the lower limit values, instead of being determined directly by calculating the Euclidean distance between the target subsequence and each of the reference subsequences.

Figure 6:
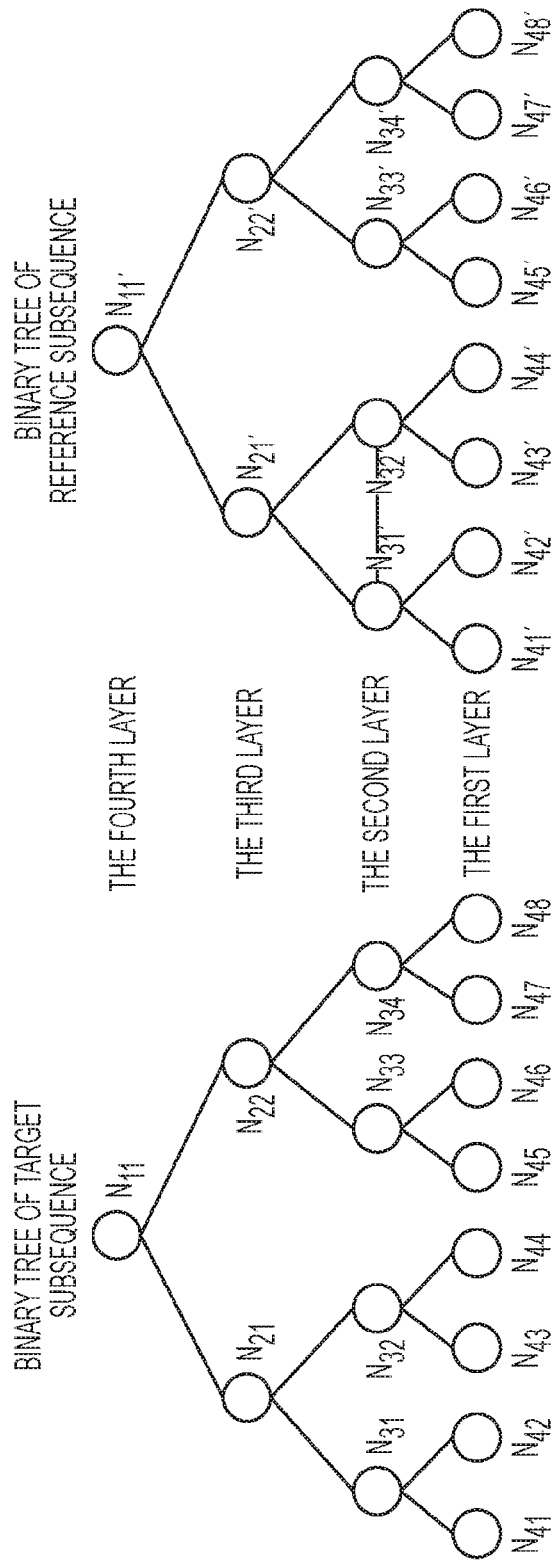
FIG. 6 shows examples of binary trees of a target subsequence and a reference subsequence.

The above-mentioned dual bounding pruning technology is based on following lemmas and theorem. For convenience of description of the lemmas and the theorem, the target subsequence is expressed by T, and the M-1 reference subsequences are expressed by $R_i$(1≤i≤M-1). In addition, the Euclidean distance between the target subsequence T and the reference subsequence $R_i$ is expressed by Dist(T,$R_i$), and it is assumed that the binary trees of the two subsequences include L layers respectively, where L≥1. FIG. 6 shows an example of the binary trees of the target subsequence T and the reference subsequence $R_i$, where the tree on the left is the binary tree of the target subsequence T, and the tree on the right is the binary tree of the reference subsequence $R_i$.

Lemma 1: an Euclidean distance $LB_{i,t}$ based on average values of a $t^{th}$ (1≤t≤L) layer of the binary trees of the target subsequence T and the reference subsequence $R_i$, between the target subsequence T and the reference subsequence $R_i$ is a lower limit value of the Euclidean distance Dist(T,$R_i$) between the target subsequence T and the reference subsequence $R_i$, and a following inequation (1) is established:

$$LB_{i,1} \leq \ldots \leq LB_{i,t} \leq \ldots \leq LB_{i,L} \leq \text{Dist}(T,R_i) \quad (1)$$

That is to say, an Euclidean distance based on average values of a lower layer of the binary trees of the target subsequence T and the reference subsequence $R_i$, between the target subsequence T and the reference subsequence $R_i$ (i.e., a lower limit value of the Euclidean distance Dist(T,Ri) between the target subsequence T and the reference subsequence $R_i$ corresponding to the lower layer of their binary trees) is less than an Euclidean distance based on average values of an upper layer of the binary trees of the target subsequence T and the reference subsequence $R_i$, between the target subsequence T and the reference subsequence $R_i$ (i.e., a lower limit value of the Euclidean distance Dist(T,$R_i$)

between the target subsequence T and the reference subsequence $R_i$, corresponding to the upper layer of their binary trees). Here, the Euclidean distance $LB_{i,t}$ based on the average values of the $t^{th}$ ($1 \leq t \leq L$) layer of the binary trees of the target subsequence T and the reference subsequence $R_i$, between the target subsequence T and the reference subsequence $R_i$ refers to the Euclidean distance between the two subsequences, calculated from to the average values stored in corresponding nodes (i.e., nodes at the same locations) in the $t^{th}$ ($1 \leq t \leq L$) layer of the binary trees of the two subsequences. For example, in the binary tree shown in FIG. 6, an Euclidean distance $LB_{i,3}$ based on average values of a third layer of the binary trees of the target subsequence T and the reference subsequence $R_i$, between the target subsequence T and the reference subsequence $R_i$ can be calculated by a following formula (2):

$$LB_{i,3} = \sqrt{(avg_{21} - avg_{21'})^2 + (avg_{22} - avg_{22'})^2} \qquad (2)$$

where $avg_{21}$ and $avg_{21'}$ are an average value stored in a first node $N_{21}$ in the third layer of the binary tree of the target subsequence T and an average value stored in a corresponding node (i.e., a first node) $N_{21'}$ in the third layer of the binary tree of the reference subsequence $R_i$ respectively, $avg_{22}$ and $avg_{22'}$ are an average value stored in a second node $N_{22}$ in the third layer of the binary tree of the target subsequence T and an average value stored in a corresponding node (i.e., a second node) $N_{22'}$ in the third layer of the binary tree of the reference subsequence $R_i$ respectively.

Lemma 2: an Euclidean distance $UB_{i,t}$ based on differences between maximum values and minimum values of the $t^{th}$ ($1 \leq t \leq L$) layer of the binary trees of the target subsequence T and the reference subsequence $R_i$, between the target subsequence T and the reference subsequence is an upper limit value of the Euclidean distance $Dist(T,R_i)$ between the target subsequence T and the reference subsequence $R_i$, and a following inequation (3) is established:

$$Dist(T,R_i) \leq UB_{i,1} \leq \ldots \leq UB_{i,t} \leq \ldots \leq UB_{i,L} \qquad (3)$$

That is to say, an Euclidean distance based on differences between maximum values and minimum values of a lower layer of the binary trees of the target subsequence T and the reference subsequence $R_i$, between the target subsequence T and the reference subsequence $R_i$ (i.e., an upper limit value of the Euclidean distance $Dist(T,R_i)$ between the target subsequence T and the reference subsequence $R_i$, corresponding to the lower layer of their binary trees) is less than an Euclidean distance based on differences between maximum values and minimum values of an upper layer of the binary trees of the target subsequence T and the reference subsequence $R_i$, between the target subsequence T and the reference subsequence $R_i$ (i.e., an upper limit value of the Euclidean distance $Dist(T,R_i)$ between the target subsequence T and the reference subsequence $R_i$, corresponding to the upper layer of their binary trees). Here, the Euclidean distance $UB_{i,t}$ based on the differences between the maximum values and the minimum values of the $t^{th}$ ($1 \leq t \leq L$) layer of the binary trees of the target subsequence T and the reference subsequence $R_i$, between the target subsequence T and the reference subsequence $R_i$ refers to the Euclidean distance between the two subsequences, calculated from the differences between the maximum values and the minimum values stored in corresponding nodes (i.e., nodes at the same locations) in the $t^{th}$ layer of the binary trees of the two subsequences. For example, in the binary tree shown in FIG. 6, assume that node $N_{21}$ in the third layer of the binary tree of the target subsequence T stores a maximum value $Max_{21}$ and a minimum value $Min_{21}$, and node $N_{22}$ stores a maximum value $Max_{22}$ and a minimum value $Min_{22}$, node $N_{21'}$ in the third layer of the binary tree of the reference subsequence $R_i$ stores a maximum value $Max_{21'}$ and a minimum value $Min_{21'}$, and node $N_{22'}$ stores a maximum value $Max_{22'}$ and a minimum value $Min_{22'}$, then an Euclidean distance $UB_{i,3}$ based on the differences between the maximum values and the minimum values of the third layer of the binary trees, between the target subsequence T and the reference subsequence $R_i$, can be calculated by a following formula (4):

$$UB_{i,3} = \max \left\{ \begin{array}{l} \sqrt{(max_{21} - min_{21'})^2 + (max_{22} - min_{22'})^2}, \\ \sqrt{(max_{21'} - min_{21})^2 + (max_{22'} - min_{22})^2} \end{array} \right\} \qquad (4)$$

Lemma 3: for the target subsequence T and two reference subsequences $R_i$ and $R_j$ ($1 \leq j \leq M-1$, $j \neq i$), if the upper limit value $UB_{i,t}$ of the Euclidean distance $Dist(T,R_i)$ between the target subsequence T and the reference subsequence $R_i$, corresponding to the $t^{th}$ layer of their binary trees is less than or equal to the lower limit value $LB_{j,t}$ of the Euclidean distance $Dist(T,R_j)$ between the target subsequence T and the reference subsequence $R_j$, corresponding to the $t^{th}$ layer of their binary trees, then $Dist(T,R_i)$ is less than or equal to $Dist(T,R_j)$, i.e., $$\text{If } UB_{i,t} \leq LB_{j,t}, \text{ then } Dist(T,R_i) \leq Dist(T,R_j) \qquad (5)$$

From the above-mentioned Lemmas 1-3, Theorem 1 can be derived as follows.

Theorem 1: for the target subsequence T and the two reference subsequences $R_i$ and $R_j$ ($1 \leq j \leq M-1$, $j \neq i$), if the upper limit value $UB_{i,t}$ of the Euclidean distance $Dist(T,R_i)$ between the target subsequence T and the reference subsequence $R_i$, corresponding to the $t^{th}$ layer of their binary trees is less than or equal to the lower limit value $LB_{j,h}$ of the Euclidean distance $Dist(T,R_j)$ between the target subsequence T and the reference subsequence $R_j$, corresponding to a $h^{th}$ ($1 \leq h \leq L$) layer of their binary trees, then $Dist(T,R_i)$ is less than or equal to $Dist(T,R_j)$, i.e., $$\text{If } UB_{i,t} \leq LB_{j,h}, \text{ then } Dist(T,R_i) \leq Dist(T,R_j) \qquad (6)$$

It can be known from Theorem 1 that if the upper limit value of the Euclidean distance between the target subsequence T and the reference subsequence $R_i$, corresponding to any layer of the binary trees is less than or equal to the lower limit value of the Euclidean distance between the target subsequence T and the reference subsequence $R_j$, corresponding to any layer of the binary trees, the Euclidean distance between the target subsequence T and the reference subsequence $R_i$ is necessarily less than or equal to the Euclidean distance between the target subsequence T and the reference subsequence $R_j$. Therefore, the K neighbors nearest to the target subsequence can be found in the M-1 reference subsequences through the upper limit values and the lower limit values (i.e., the dual bounding) of the Euclidean distances between the target subsequence and the respective reference subsequences. Since calculations of the upper limit values and the lower limit values corresponding to the respective layers of the binary trees only need to use the data or values stored in the nodes of the respective layers, and the amount of these data or values is greatly less than the amount of the data contained in the subsequences, the computation amount for determining the K neighbors of the target subsequence can be reduced greatly, and the required time can be shortened. In addition, in consideration of a hierarchical characteristic of the binary trees, the upper limit values and the lower limit values can be calculated from the uppermost layer (i.e., the layer where the root node is located) in an order from top to bottom for use in the determination of the neighbors of the target subsequence.

That is to say, in block S302, the upper limit values and the lower limit values of the Euclidean distances between the target subsequence and the respective reference subsequences, corresponding to one or more layers of the binary trees of the target subsequence and the M-1 reference subsequences can be calculated based on the data or values stored in the nodes in the one or more layers of the binary trees, respectively, starting from the uppermost layer of the binary trees, and the neighbors of the target subsequence can be determined on the basis of the upper limit values and the lower limit values of the Euclidean distances between the target subsequence and the respective reference subsequences, until the second number of neighbors of the target subsequence are determined Specifically, if the upper limit value of the Euclidean distance between the target subsequence and one of the M-1 reference subsequences is less than the lower limit values of the Euclidean distances between the target subsequence and the other ones of the M-1 reference subsequences, the one reference subsequence can be determined as the neighbor of the target subsequence.

Hereinafter, detailed operations of block S302 are described with reference to FIG. 7.

Figure 7:
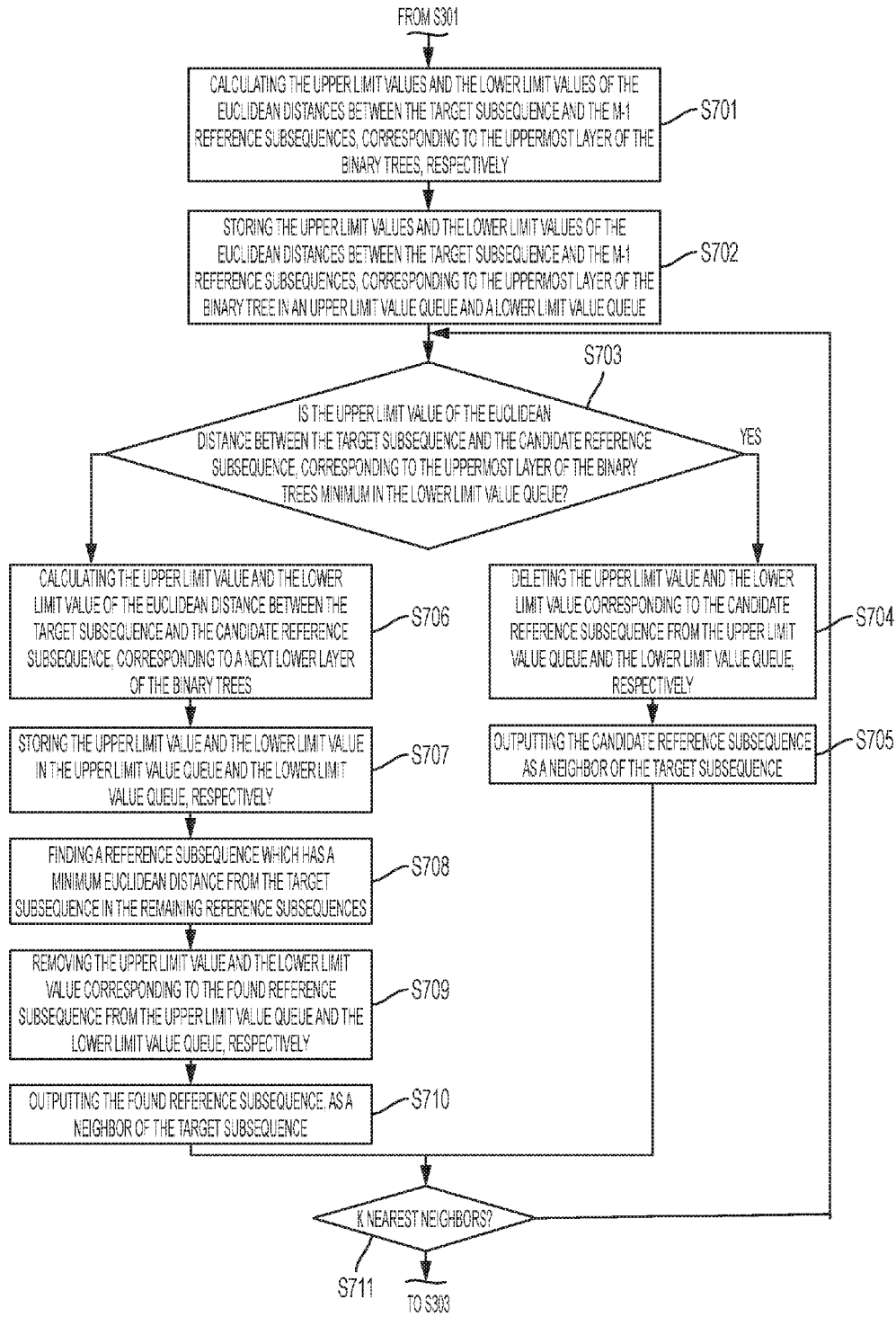
FIG. 7 is a flow chart showing detailed operations of block S302 shown in FIG. 3.

As shown in FIG. 7, in block S701, the upper limit values and the lower limit values of the Euclidean distances between the target subsequence and the M-1 reference subsequences, corresponding to the uppermost layer of the binary trees can be calculated respectively. The method for calculating the upper limit values and the lower limit values is the same as the method described above, and a description thereof is omitted here.

In block S702, the upper limit values and the lower limit values of the Euclidean distances between the target subsequence and the M-1 reference subsequences, corresponding to the uppermost layer of the binary tree are stored in an upper limit value queue and a lower limit value queue, respectively. In the upper limit value queue, respective upper limit values may be sorted in a descending order. In the lower limit value queue, respective lower limit values may also be sorted in a descending order.

In block S703, a reference subsequence (referred to as candidate reference subsequence hereinafter for convenience of description) corresponding to a minimum lower limit value stored in the lower limit value queue is found, and it is determined whether the upper limit value of the Euclidean distance between the target subsequence and the candidate reference subsequence, corresponding to the uppermost layer of the binary trees is minimum in the respective lower limit values stored in the lower limit value queue.

If a positive determination result is obtained in block S703, then according to the above-mentioned Theorem 1, it can be determined that the candidate reference subsequence is a reference subsequence which has a minimum Euclidean distance from the target subsequence. Therefore, in block S704, the upper limit value and the lower limit value corresponding to the candidate reference subsequence are respectively deleted from the upper limit value queue and the lower limit value queue, and in block S705, the candidate reference subsequence is output as one of the K neighbors (nearest neighbors) of the target subsequence.

On the contrary, if a negative determination result is obtained in block S703, then the neighbors of the target subsequence cannot be determined according to the above-mentioned Theorem 1. Therefore, in block S706, the upper limit value and the lower limit value of the Euclidean distance between the target subsequence and the candidate reference subsequence, corresponding to a next lower layer of the binary trees is calculated, and in block S707, the upper limit value and the lower limit value are respectively stored in the upper limit value queue and the lower limit value queue so as to update the two queues, where the upper limit values and the lower limit value in the respective queues are still sorted in a descending order.

Then, in block S708, a reference subsequence which has a minimum Euclidean distance from the target subsequence is found from the reference subsequences except the candidate reference subsequence. This reference subsequence can be found by using any method commonly known in the art, and a description thereof is omitted here.

Next, in block S709, the upper limit value and the lower limit value corresponding to the reference subsequence found in block S708 are removed from the upper limit value queue and the lower limit value queue, respectively, and then in block S710, the found reference subsequence is outputted as one of the K nearest neighbors of the target subsequence.

Then, in block S711, it is determined whether the K nearest neighbors of the target subsequence have been found. If yes, the operations of block S302 are terminated. On the contrary, if the K nearest neighbors of the target subsequence have not been found, then the process returns to block S703, and the above-mentioned operations are repeated based on the current lower limit value queue and the current upper limit value queue, until the K nearest neighbors of the target subsequence are found.

Returning to FIG. 3, in block S303, a third number of neighbors (i.e., nearest neighbors) of each reference subsequence in the K reference subsequences can be determined, where the third number of neighbors of each reference subsequence in the K reference subsequences is the third number of subsequences, which have minimum Euclidean distances from the each reference subsequence, in the data sequence. The third number may be equal to the second number, therefore the third number is also set to K hereinafter.

Specifically, since the abnormal subsequence is detected in the temporal order, K nearest neighbors of each reference subsequence generated before the target subsequence have been determined before it is detected whether the current target subsequence is abnormal. However, after the target subsequence is generated, the K nearest neighbors of each reference subsequence generated previously may change, accordingly it is necessary to re-determine (i.e., update) the K nearest neighbors of these reference subsequences. In the embodiment of the present invention, when it is determined whether the target subsequence is abnormal, unlike the conventional method in which data or subsequences of the entire time data sequence are considered, only data of a local reference subsequence influenced by the target subsequence in the data sequence may be considered (see block S304 described below), where the local reference subsequence influenced by the target subsequence refers to the reference subsequence which is mutually one of the K nearest neighbors with the target subsequence. Therefore, in block S303, the K nearest neighbors may be determined only for the K reference subsequences which belong to neighbors nearest to the target subsequence determined in block S302. The K nearest neighbors of the respective reference subsequences may be determined by the above-mentioned method for determining the K nearest neighbors of the target subsequence, or by other methods commonly known in the art, and a detailed description thereof is omitted herein.

Next, in block S304, it is determined whether the target subsequence is the abnormal subsequence, according to the K nearest neighbors of the target subsequence, and the K (the third number) nearest neighbors of the reference subsequences, which have the target subsequence as a neighbor thereof, in the K nearest neighbors (reference subsequences) of the target subsequence.

As described above, when it is determined whether the target subsequence is abnormal, only the local reference subsequence influenced by the target subsequence, i.e., the reference subsequence which is one of the K nearest neighbors of the target subsequence and of which the K nearest neighbors include the target subsequence, in the data sequence may be considered. Therefore, after the K neighbors of each of the K reference subsequences are determined in block S303, the reference subsequence in the K reference subsequences which has the target subsequence as one of the K neighbors thereof may be found, as the local reference subsequence influenced by the target subsequence. Then, it can be determined whether the target subsequence is the abnormal subsequence based on the K nearest neighbors of the target subsequence, and the K neighbors of the local reference subsequence. Briefly, it may be determined whether the target subsequence is the abnormal subsequence according to an approximation degree between the target subsequence and the K neighbors thereof, and an approximation degree between the local reference subsequence and the K neighbors thereof. If the approximation degree between the target subsequence and the K neighbors thereof differs greatly from the approximation degree between the local reference subsequence and the K neighbors thereof, then the target subsequence can be identified as the abnormal subsequence.

Specifically, a reciprocal of an average value of Euclidean distances between the target subsequence and the K neighbors (i.e., nearest neighbors) thereof may be calculated firstly. The reciprocal of the average value may indicate a distribution density of the target subsequence and the K neighbors thereof in a two-dimensional space when the target subsequence and the K neighbors thereof are mapped as points in the two-dimensional space, i.e., may indicate the approximation degree between the target subsequence and the K neighbors thereof.

Next, a reciprocal of an average value of Euclidean distances between each reference subsequence (i.e., local reference subsequence) which has the target subsequence as the neighbor thereof, in the K reference subsequences and the K neighbors thereof may be calculated. Then, an average value of the reciprocals of the average values corresponding to the respective local reference subsequences may be calculated, and the average value may indicate a distribution density of the respective local reference subsequences and the K neighbors thereof in the two-dimensional space, i.e., may indicate the approximation degree between the respective local reference subsequences and the K neighbors thereof.

Then, it may be determined whether the target subsequence is the abnormal subsequence on the basis of the reciprocal of the average value of the Euclidean distances between the target subsequence and the K neighbors thereof, and the average value of the reciprocals of the average values corresponding to the respective local reference subsequences. Specifically, a ratio between the average value of the reciprocals of the average values corresponding to the respective local reference subsequences and the reciprocal of the average value of the Euclidean distances between the target subsequence and the K neighbors thereof may be calculated, and the target subsequence may be determined as the abnormal subsequence when the ratio is greater than a predetermined threshold value. The threshold value may be set flexibly according to actual needs and/or detection accuracy. That is to say, the target subsequence can be identified to be abnormal, when the distribution density of the respective local reference subsequences and the K neighbors thereof in the two-dimensional space differs greatly from the distribution density of the target subsequence and the K neighbors thereof in the two-dimensional space.

It can be seen that in the above-mentioned method according to the embodiment of the present invention, it is detected whether the target subsequence is the abnormal subsequence, on the basis of the data of the reference subsequence influenced by the target subsequence in the data sequence, other than all the data of the data sequence, thus the computation amount and the required time for the detection may be reduced, and accuracy of the detection may be improved. In addition, for the time data sequence formed by the data generated constantly over time, whenever a new subsequence is generated, the above method can be used to detect whether the subsequence is the abnormal subsequence, thus the real time detection can be realized.

The respective embodiments for implementing the method of the present invention have been described above with reference to the accompanying drawings. Those skilled in the art can understand that, the above-mentioned method may be implemented by software, hardware, or a combination thereof. In addition, those skilled in the art can understand that, by implementing the respective operations of the above method by software, hardware, or a combination thereof, an apparatus for detecting abnormal subsequences in a data sequence can be provided on the basis of the same inventive concept. Even if the apparatus is the same as a general-purpose processing device in hardware structure, the apparatus presents characteristics different from those of the general-purpose processing device due to the software included therein, and thus the apparatus according to the respective embodiments of the present invention. The apparatus in the present invention comprises several units or modules, which are configured to execute the corresponding operations. Those skilled in the art can understand how to write a program to implement actions executed by the units or the modules by reading the present specification.

Hereinafter, the apparatus for detecting the abnormal subsequences in the data sequence according to the respective embodiments of the present invention will be described in detail with reference to FIG. 8. Because the apparatus and the method are based on the same inventive concept, the same or corresponding implementation details in the method are also applicable to the apparatus corresponding to the method, and since the implementation details have been completely described above in detail, they may be not described hereinafter.

As described above, the data sequence may be a time data sequence or a data sequence in other form. Here, the apparatus is described by taking the time data sequence as an example. The time data sequence may be divided into a plurality of subsequences by a sliding window according to the above-mentioned method, which will not be described repeatedly here. In addition, it may be detected whether each of the subsequence is an abnormal subsequence in a temporal order. In such a case, for convenience of description, a newly generated subsequence on which the detection of the abnormal subsequences is to be performed is called a target subsequence, and one or more subsequences generated prior to the target subsequence are called reference subsequences.

Figure 8:
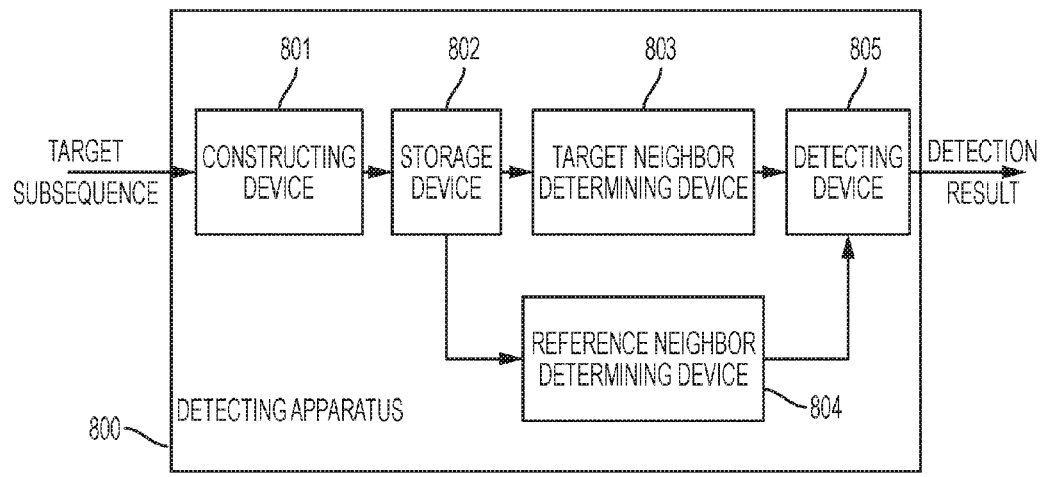
FIG. 8 is a block diagram showing an apparatus for detecting abnormal subsequences in a data sequence according to an embodiment of the present invention.

As shown in FIG. 8, the apparatus 800 (hereinafter referred to as detecting apparatus) for detecting the abnormal subsequences in the data sequence according to the embodiment of the present invention comprises a constructing device 801, a storage device 802, a target neighbor determining device 803, a reference neighbor determining device 804, and a detecting device 805.

The constructing device 801 can construct a hierarchical data structure of the target subsequence, where each node in a bottommost layer of the hierarchical data structure stores corresponding data of the target subsequence, and each node in a layer above the bottommost layer stores values derived based on data stored in corresponding nodes in a lower layer next to the layer above the bottommost layer. As described above, the values stored by each node in the layer above the bottommost layer and derived based on the data stored in the corresponding nodes in the lower layer next to the layer above the bottommost layer may be an average value, a maximum value and a minimum value of the data stored in the corresponding nodes, and the hierarchical data structure may be a tree such as a binary tree, or other non-tree hierarchical data structure. Here, the binary tree is taken as an example of the hierarchical data structure. In such a case, the constructing device 801 can construct the binary tree of the target subsequence in the way described above with reference to FIGS. 3-5. Then, the constructing device 801 may store the binary tree of the target subsequence into the binary tree queue. The binary tree queue can be stored in the storage device 802.

The target neighbor determining device 803 may determine K (i.e., the second number) neighbors (i.e., nearest neighbors) of the target subsequence, on the basis of the binary tree of the target subsequence and binary tree of the first number of reference subsequences constructed in advance, where the K neighbors of the target subsequence are K reference subsequences, which have minimum Euclidean distances from the target subsequence, in the M-1 reference subsequences.

Specifically, as described above, the target neighbor determining device 803 may calculate upper limit values and lower limit values of Euclidean distances between the target subsequence and the respective reference subsequences, corresponding to one or more layers of the binary trees of the target subsequence and the M-1 reference subsequences based on the data or values stored in nodes in the one or more layers of the binary trees, respectively, starting from an uppermost layer of the binary trees, and determine the neighbors of the target subsequence on the basis of the upper limit values and the lower limit values of the Euclidean distances between the target subsequence and the respective reference subsequences, until the second number of neighbors of the target subsequence are determined. More specifically, if the upper limit value of the Euclidean distance between the target subsequence and one of the M-1 reference subsequences is less than the lower limit values of the Euclidean distances between the target subsequence and the other ones of the M-1 reference subsequences, the one reference subsequence can be determined as the neighbor of the target subsequence. The target neighbor determining device 803 may determine the K neighbors of the target subsequence in the manner described above with reference to FIG. 7, and a description thereof is omitted here.

The reference neighbor determining device 804 may determine (i.e., update) the third number of neighbors (i.e., nearest neighbors) of each reference subsequence in the K reference subsequences, where the third number of neighbors are the third number of subsequences, which have minimum Euclidean distances from the each reference subsequence, in the data sequence. The third number may be equal to the second number, and thus is also set to K hereinafter.

The detecting device 805 may determine whether the target subsequence is the abnormal subsequence, according to the K nearest neighbors of the target subsequence, and the K neighbors of the reference subsequences (i.e. the local reference subsequences described above), which have the target subsequence as a neighbor thereof, in the K nearest neighbors (reference subsequences) of the target subsequence. Briefly, the detecting device 805 may determine whether the target subsequence is the abnormal subsequence according to the approximation degree between the target subsequence and the K nearest neighbors thereof, and the approximation degree between the local reference subsequences and the K nearest neighbors thereof. Specifically, the detecting device 805 may firstly calculate the reciprocal of the average value of the Euclidean distances between the target subsequence and the K neighbors (i.e., nearest neighbors) thereof, so as to determine the approximation degree between the target subsequence and the K nearest neighbors thereof. Next, for each local reference subsequence, the detecting device 805 may calculate the reciprocal of the average value of the Euclidean distances between the local reference subsequence and the K neighbors thereof, then calculate the average value of the reciprocals of the average values corresponding to the respective local reference subsequences, so as to determine the approximation degree between the local reference subsequences and the K nearest neighbors thereof. Next, the detecting device 805 may determine whether the target subsequence is the abnormal subsequence, on the basis of the reciprocal of the average value of the Euclidean distances between the target subsequence and the K neighbors thereof, and the average value of the reciprocals of the average values corresponding to the respective local reference subsequences. Specifically, the detecting device 805 may calculate the ratio between the average value of the reciprocals of the average values corresponding to the respective local reference subsequences and the reciprocal of the average value of the Euclidean distances between the target subsequence and the K neighbors thereof, and determine the target subsequence as the abnormal subsequence when the ratio is greater than the predetermined threshold value.

In this way, with the apparatus according to the above embodiments of the present invention, the abnormal subsequence in the data sequence can be detected simply and accurately, so that the abnormal data in the data sequence can be detected. In addition, whenever a new subsequence is generated, the above apparatus can be used to detect whether the subsequence is an abnormal subsequence, so that the real time detection can be achieved.

Figure 9:
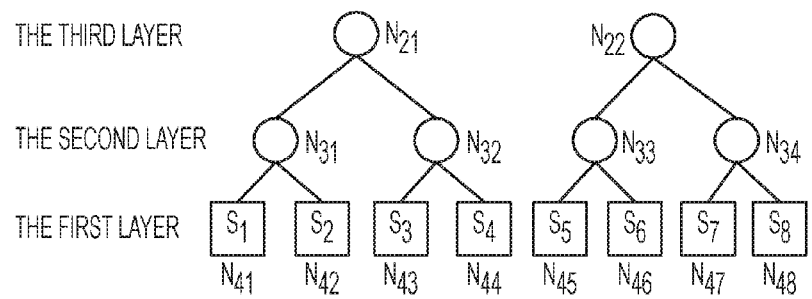
FIG. 9 is a diagram showing an example of a hierarchical data structure according to the embodiments of the present invention.

Various embodiments of the present invention have been described above. It is to be appreciated that, the above descriptions are merely illustrative, rather than limitative, and those skilled in the art can make appropriate modifications or alternations therein without departing from the scope of the present invention. For example, although the binary tree is taken as an example in the above to describe the embodiments of the present invention, the embodiments of the present invention are also applicable to other hierarchical data structures. For example, in the example where the target subsequence includes 8 pieces of data $S_1$, $S_2$, $S_3, \ldots, S_8$ described above, a hierarchical data structure shown in FIG. 9 may be constructed, which includes first to three layers same as those of the binary tree shown in FIG. 4, but does not include the fourth layer of the binary tree shown in FIG. 4. In such a case, the method and the apparatus described above may still be used to detect the abnormal subsequence in the same way. In addition, although it is mentioned in the above that the detecting apparatus includes the storage device, the storage device may be omitted in some embodiments. In addition, although it is detected whether the target subsequence is the abnormal subsequence according to the ratio between the average value of the reciprocals of the average values corresponding to the respective local reference subsequences and the reciprocal of the average value of the Euclidean distances between the target subsequence and the K neighbors thereof in the above, this is not limitative, and it may be detected whether the target subsequence is the abnormal subsequence in other ways. For example, a difference between the average value of the reciprocals of the average values corresponding to the respective local reference subsequences and the reciprocal of the average value of the Euclidean distances between the target subsequence and the K neighbors thereof may be calculated, and the target subsequence may be determined as the abnormal subsequence when the difference is greater than a threshold value.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for detecting an abnormal subsequence in a data sequence, the data sequence including a target subsequence to be detected and a first number of reference subsequences, the apparatus comprising:
   a constructing device, configured to construct a hierarchical data structure of the target subsequence, each node in a bottommost layer of the hierarchical data structure storing corresponding data of the target subsequence, and each node in a layer above the bottommost layer storing values derived based on data stored in corresponding nodes in a lower layer next to the layer above the bottommost layer;
   a target neighbor determining device, configured to determine a second number of neighbors of the target subsequence based on the hierarchical data structure of the target subsequence and a pre-constructed hierarchical data structure of the first number of reference subsequences, the second number of neighbors of the target subsequence being a second number of reference subsequences, which have minimum Euclidean distances from the target subsequence, in the first number of reference subsequences;
   a reference neighbor determining device, configured to determine a third number of neighbors of each reference subsequence in the second number of reference subsequences, the third number of neighbors being a third number of subsequences, which have minimum Euclidean distances from the each reference subsequence in the second number of reference subsequences, in the data sequence; and
   an anomaly detecting device, configured to determine whether the target subsequence is an abnormal subsequence, according to the second number of neighbors of the target subsequence, and the third number of neighbors of a reference subsequence, which has the target subsequence as a neighbor thereof, in the second number of reference subsequences.

2. The apparatus of claim 1, wherein the hierarchical data structure is a binary tree.

3. The apparatus of claim 1, wherein the values stored by the each node in the layer above the bottommost layer and derived based on the data stored in the corresponding nodes in the lower layer next to the layer above the bottommost layer comprise an average value, a maximum value and a minimum value of the data stored in the corresponding nodes, and wherein the target neighbor determining device is configured to determine upper limit values and lower limit values of Euclidean distances between the target subsequence and respective reference subsequences, corresponding to one or more layers of the hierarchical data structure of the target subsequence and the first number of reference subsequences, based on the data or values stored in nodes in the one or more layers of the hierarchical data structure, respectively, starting from an uppermost layer of the hierarchical data structure, and determine the second number of the neighbors of the target subsequence on the basis of the upper limit values and the lower limit values, until the second number of neighbors of the target subsequence are determined.

4. The apparatus of claim 3, wherein the target neighbor determining device is configured to determine one reference subsequence in the first number of reference subsequences as the neighbor of the target subsequence, in response to determining that an upper limit value of the Euclidean distance between the target subsequence and the one reference subsequence is smaller than lower limit values of the Euclidean distances between the target subsequence and the other reference subsequences in the first number of reference subsequences.

5. The apparatus of claim 1, wherein the third number is equal to the second number, and wherein the anomaly detecting device is configured to determine whether the target subsequence is the abnormal subsequence, according to an approximation degree between the target subsequence and the second number of neighbors, and an approximation degree between the reference subsequence, which has the target subsequence as the neighbor thereof, in the second number of reference subsequences and the third number of neighbors thereof.

6. The apparatus of claim 5, wherein the anomaly detecting device is configured to determine whether the target subsequence is the abnormal subsequence, according to the approximation degrees by:

calculating a reciprocal of an average value of Euclidean distances between the target subsequence and the second number of neighbors thereof, so as to determine the approximation degree between the target subsequence and the second number of neighbors of the target subsequence;

calculating a reciprocal of an average value of Euclidean distances between each reference subsequence in the second number of reference subsequences, which have the target subsequence as the neighbor thereof, in the second number of reference subsequences and the third number of neighbors;

calculating an average value of reciprocals of average values corresponding to the respective reference subsequence, which has the target subsequence as the neighbor thereof, in the second number of reference subsequences, so as to determine the approximation degree between the reference subsequence, which has the target subsequence as the neighbor thereof, in the second number of reference subsequences and the third number of neighbors thereof; and determining whether the target subsequence is the abnormal subsequence, based on the reciprocal of the average value of the Euclidean distances between the target subsequence and the second number of neighbors thereof, and the average value of the reciprocals of the average values corresponding to the respective reference subsequence, which has the target subsequence as the neighbor thereof, in the second number of reference subsequences.

7. The apparatus of claim 6, wherein the anomaly detecting device is configured to calculate a ratio between the average value of the reciprocals of the average values corresponding to the respective reference subsequence, which has the target subsequence as the neighbor thereof, in the second number of reference subsequences and the reciprocal of the average value of the Euclidean distances between the target subsequence and the second number of neighbors thereof, and determine that the target subsequence is the abnormal subsequence, in response to determining that the ratio is greater than a predetermined threshold value.

* * * * *